(12) United States Patent
Huang et al.

(10) Patent No.: US 11,049,133 B1
(45) Date of Patent: Jun. 29, 2021

(54) AUTOMATED SERVER-BASED CONTENT DELIVERY

(71) Applicant: Amazon Technologies, Inc., Seattle, WA (US)

(72) Inventors: Jim Huang, Seattle, WA (US); Weam Abu Zaki, Seattle, WA (US); Cody Barnhart, Seattle, WA (US); Teresa Chen, Bellevue, WA (US); Paula Marie Despins, Seattle, WA (US); Yu Gan, Seattle, WA (US); Kelly Paulson, Seattle, WA (US); Kyle Tiffany, Seattle, WA (US); Fabian Lutz-Frank Wauthier, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 562 days.

(21) Appl. No.: 15/187,429

(22) Filed: Jun. 20, 2016

(51) Int. Cl.
*G06Q 30/02* (2012.01)
(52) U.S. Cl.
CPC ..... *G06Q 30/0244* (2013.01); *G06Q 30/0249* (2013.01)
(58) Field of Classification Search
CPC ........... G06Q 30/0207; G06Q 30/0244; G06Q 30/0249
See application file for complete search history.

(56) References Cited

U.S. PATENT DOCUMENTS

| | | | | |
|---|---|---|---|---|
| 2007/0027771 A1* | 2/2007 | Collins | .............. | G06Q 30/0249 705/14.48 |
| 2011/0225042 A1* | 9/2011 | Cetin | ................ | G06Q 30/0254 705/14.52 |
| 2012/0041816 A1* | 2/2012 | Buchalter | .......... | G06Q 30/0242 705/14.41 |
| 2014/0304069 A1* | 10/2014 | Lacey | ................ | G06Q 30/0249 705/14.48 |
| 2014/0337143 A1* | 11/2014 | Petersen | ............ | G06Q 30/0275 705/14.71 |

(Continued)

OTHER PUBLICATIONS

Kivinen Exponentiated Gradient versus Gradient Descent for Linear Predictors published in Information and computation 132, 1_63 (Year: 1997).*

(Continued)

*Primary Examiner* — Breffni Baggot
(74) *Attorney, Agent, or Firm* — Eversheds Sutherland (US) LLP

(57) ABSTRACT

Systems, methods, and computer-readable media are disclosed for automated server-based content delivery. In one embodiment, an example method may include determining campaign information for a content delivery campaign, the campaign information comprising a first allocation value for first content, and a second allocation value for second content, determining first observed data comprising a first user response rate for the first content and a second user response rate for the second content, determining an exponentiated gradient algorithm for the content delivery campaign, and determining a reallocation amount to reallocate a portion of the first allocation value to the second allocation value using the exponentiated gradient algorithm based at least in part on the first observed data, wherein the reallocation amount maximizes an output of the exponentiated gradient algorithm.

18 Claims, 6 Drawing Sheets

(56) References Cited

U.S. PATENT DOCUMENTS

| | | | |
|---|---|---|---|
| 2015/0206179 A1* | 7/2015 | Tulloch | G06Q 50/01 705/14.46 |
| 2015/0317670 A1* | 11/2015 | Cavander | G06Q 30/0273 705/14.41 |
| 2016/0034948 A1* | 2/2016 | Zhong | G06Q 30/0246 705/14.45 |
| 2016/0314514 A1* | 10/2016 | High | G06Q 30/0641 |

OTHER PUBLICATIONS

Wiley Encyclopedia of Computer Science and Engineering (Year: 2009).*

* cited by examiner

AUTOMATED SERVER-BASED CONTENT DELIVERY

BACKGROUND

Certain user interactions may be desired in response to presented content. For example, a desired response to a survey presented to a user may be for the user to complete the survey. In another example, a desired response to a message requesting feedback sent to a user may be for the user to reply with feedback. In certain instances, user interactions may be quantifiable. For example, a response rate for messages requesting feedback may be determined to be 10%, meaning that feedback was received from 10% of the users to which the message requesting feedback was sent. User interaction may be affected by certain parameters that affect delivery of content. Moreover, content delivery parameters may be updated over the course of a campaign, so as to increase user interaction. As a result, adjusting such content delivery parameters may affect user interaction.

Figure 1:
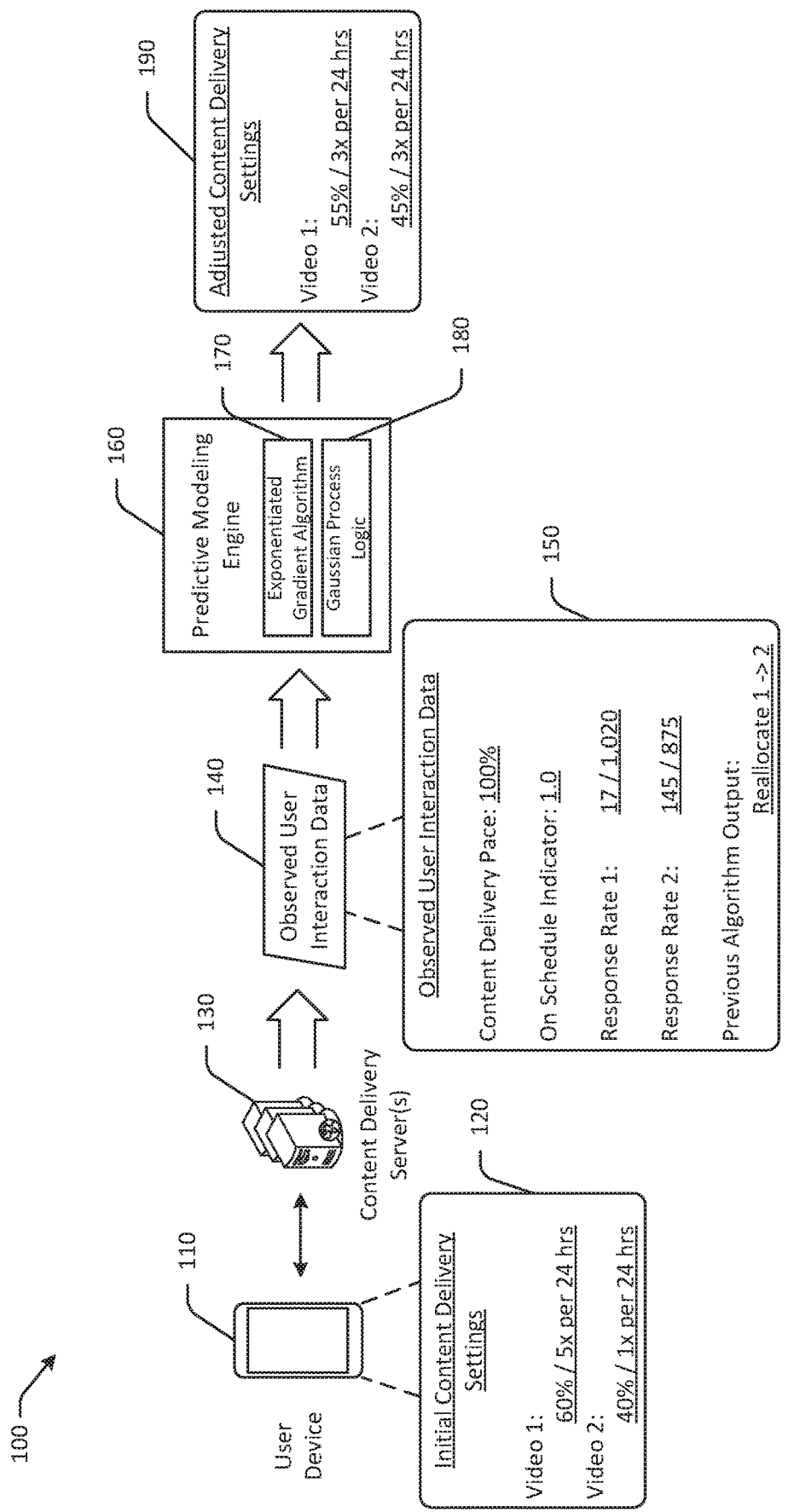
FIG. 1 is a hybrid system and process flow diagram illustrating automated server-based content delivery in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Content creators or content providers may desire to deliver content to particular users, types or groups of users, or other targeted users. Content creators or content providers may also desire to deliver certain content within a particular period or length of time. To initiate delivery of content associated with a content campaign, target consumers, targeting criteria, flight time, and other content delivery parameters may be set. For example, a campaign manager may manually set one or more content delivery parameters that may be used to deliver content over the course of a campaign. In generating content for delivery, content creators or content providers may desire a particular user response or user interaction in response to consuming the content. For example, a content creator may desire a user response or user interaction of reading or writing product reviews after consuming content, or another desired user response or user interaction. Due to the costs associated with content delivery, content creators or content providers may provide guidelines or delivery constraints on delivery of content to users. Delivery of content may be affected by a number of different parameters, such as cost of delivery, length of flight time of content, constraints on delivery (e.g., targeting constraints for users, etc.), distribution channels, and other parameters. Each parameter, however, may affect user interaction and/or a rate of user interaction. Embodiments of the disclosure may determine budget allocation values that optimize objective functions of interest subject to one or more constraints being satisfied. For example, a budget allocation constraint may indicate that mobile onside content cannot be assigned a budget greater than 60% of a total budget allocated to mobile content. Content creators may have certain goals for content, such as a goal of maximum user interaction, a goal of maximum user reach, or another goal. Accordingly, content creators or content providers may desire to maximize user interaction in response to consumption of content created, or otherwise provided, by the content creator or content provider. Further, over the course of a campaign, certain modifications or adjustments to one or more campaign content delivery parameters may result in increased user interaction. For example, a certain distribution channel, such as mobile device content delivery, may be more effective at engaging users than another distribution channel, such as television content delivery. Embodiments of the disclosure may manage a content delivery strategy for a content campaign, including automatically managing content delivery parameters such as budget allocation, frequency cap values, base bid values, and other parameters.

In the context of online content delivery, content may be delivered for presentation (e.g., rendering) in an available content slot. Presentation of the content in an available content slot may be referred to as serving an impression. As used herein, the terms "content slot" or "available content slot" may refer generally to a location, environment, or placeholder in which, or in connection with which, an impression of content may be served. In a more specific context, these terms may refer to, for example, a particular location on a web page or within an application at which an impression of content may be presented to and potentially consumed by a user.

This disclosure relates to, among other things, systems, methods, computer-readable media, techniques, and methodologies for automated server-based content delivery. Content creators, such as advertisers, brand owners, or other content creators, may develop marketing or other content campaigns that are directed towards specific consumers or that are for consumption over a particular flight time (e.g., 1 month, winter season, New Year's holiday, etc.). For example, a content campaign may be directed toward a target consumer, which may be a consumer within a certain demographic or certain geography, a consumer that has certain attributes (e.g., recent purchases or browsing history, etc.), a consumer that has specific preferences or characteristics, or other targeting criteria. Delivery of content to consumers may be affected by a number of parameters, including, for example, a budget for delivery of the content, a frequency cap associated with the content campaign, and other parameters. A total budget for content delivery may be allocated across one or more pieces of content associated with a content campaign, as well as across any number of distribution channels.

Embodiments of the disclosure may provide a framework for the application of data sciences and machine learning to inform, automate, and standardize decision making across content delivery processes. Certain aspects of content delivery campaigns may be automated to increase campaign performance, reduce manual management (e.g., campaign manager involvement), and reduce variability in outcomes. In embodiments of the disclosure, optimization levers that are most frequently adjusted by campaign managers, as determined based at least in part on historical data, may be automatically tuned over a flight time of a campaign, so as to optimize user interaction with content associated with the campaign. For example, budget allocations may be adjusted so as to shift budget from relatively lower performing content to relatively higher performing content and/or distribution channels, or specific sites may be targeted using embodiments of the disclosure. Other content delivery parameters, such as frequency caps or based bids, may also be automatically adjusted by embodiments of the disclosure.

Content creators or content providers may desire to achieve maximum effectiveness of a content campaign. Effectiveness of a content campaign may be determined, for example, by content campaign goals (e.g., a number of desired user interactions, such as purchases, click-throughs, new customer acquisition, increase in sales, certain click rates, etc.) and/or by determining whether a consumer presented with the content reacts in a desired manner (e.g., clicks on the content, buys the product, etc.). Campaign performance may also be measured or determined based on a return on content delivery budget (e.g., a ratio of user interactions attributed to presentation of the content to users to the content delivery budget, etc.), or by an on schedule indicator (e.g., ratio of budget consumed to expected budget consumed with a linear delivery profile, etc.). To accomplish the goals of the content campaign, content creators or content providers may desire to spend a total budget allocated for the content campaign in a manner so as to maximize desired user interaction. In certain instances, campaign goals may change over the flight time of a content campaign. For example, an initial goal of performance may change to a goal of delivery towards the end of a campaign. Embodiments of the disclosure may account for changes in campaign goals by maximizing a current goal of the content campaign.

Content delivery may be impacted by a number of parameters. For example, in some instances, an auction process may be involved in delivering content. A content provider with the highest bid in an auction for a particular content slot may present content in the content slot upon winning the auction. To determine a bid for submission in an auction, a number of parameters may be considered. For example, the bid price may be a function of a base bid value, which may be a component of a bid calculated in real-time during an auction, a maximum bid value, which may be a multiple of a base bid, or another parameter. Other parameters, such as a frequency cap or a delivery pacing metric may be used to determine a bid. For example, a frequency cap parameter may be set to a certain value. The frequency cap may represent a maximum number of times a particular user may be presented with particular content in a time interval. In one example, a frequency cap may be set to 15 times in 24 hours, meaning that a particular user may be presented with the same content up to 15 times within any 24 hour period. If the user has already been presented with content 15 times within a preceding 24 hour period, then a bid may not be submitted in an auction to present the content to the same user for a sixteenth time.

Content campaign performance or effectiveness, as determined by quantifiable desired user interactions, may be increased or otherwise increased by manipulation of one or more factors or parameters used in a function or model that determines bid values for auctions to present the content. Embodiments of the disclosure may optimize or maximize function output, or campaign performance, by manipulation of one or more parameters used in a function particular to a piece of content or a particular content campaign. For example, embodiments of the disclosure may adjust budget allocation and/or adjust a base bid value or a frequency cap value to change a number of auctions won, or to improve a quality of auctions won. In another example, a frequency cap may be adjusted so as to funnel users through a sales funnel that may otherwise not move through the sales funnel due to insufficient contact between a content campaign and a user. Embodiments of the disclosure may optimize parameter values or settings over the flight time, or a length of time a content campaign is active, of a content campaign by generating recommendations for parameter adjustments. Recommendations may be generated periodically. To generate recommendations, embodiments may analyze observed data, or actual data collected on user behavior or reactions to content, as well as content campaign performance. The observed data may be used to generate a predictive model, and adjustments to one or more parameters in the predictive model may be tested to determine which adjustments, if any, are most likely to increase performance of the content campaign. An iterative process may be completed until parameter settings converge to optimal settings and campaign performance is optimized. For certain delivery parameters, such as budget allocation, optimal values may change over time, and thus, rather than reaching or converging to an optimal value, an ongoing iterative process may be performed as observed data becomes available so as to continually update and/or track an evolving set of parameters.

Embodiments of the disclosure may solicit basic attributes of a campaign including flight dates, product categories, campaign strategy (e.g., awareness vs. purchase), information about potential target audiences, and budget. Once live campaign data is available, embodiments of the disclosure may continuously reevaluate the previously generated recommendations and generate additional recommendations when a better strategy is identified. For instance, if one channel outperforms expectations, a recommendation to shift budget to the more effective channel may be generated.

Referring to FIG. 1, an example use case 100 with a system and process flow diagram illustrating automated server-based content delivery is depicted. In the example of FIG. 1, a content campaign may be initiated by a campaign manager. The campaign manager may set initial parameters for the content campaign using a user device 110. For example, the campaign manager may set initial content delivery settings 120 for the content campaign. In some embodiments, the initial settings or recommendations for the initial settings may be determined automatically, based on historical data, for example. The initial content delivery settings 120 may include settings for one or more pieces of content associated with the content campaign. For example, the initial content delivery settings 120 may include settings for first content titled "Video 1" and for second content titled "Video 2." The first content and the second content may be for the same, or for different, distribution channels. The content delivery settings may include a budget allocation, which may be represented as a value, a percentage, or in another suitable manner, as well as a frequency cap. Some embodiments may include additional parameters, such as a base bid, or fewer parameters. A first budget allocation value for the first content may be 60%, and a second budget allocation value for the second content may be 40%. A first frequency cap value for the first content may indicate that the first content can be presented to a user up to 5 times in any 24 hour period, and a second frequency cap value for the second content may indicate that the second content may be presented to a user up to 1 time in any 24 hour period. In some embodiments, the campaign manager may manually adjust one or more values of adjustable variables or parameters over the course of a campaign, based at least in part on recommendations generated by embodiments of the disclosure. In other embodiments, one or more values of adjustable variables may be automatically adjusted so as to optimize campaign performance.

The user device 110 may be in wired or wireless communication with one or more content delivery server(s) 130. The content delivery server 130 may receive the initial content delivery settings 120 and may implement the initial content delivery settings 120 in delivering content associated with the content campaign. For example, the content delivery server 130 may target certain users for delivery of content based at least in part on targeting criteria associated with the content campaign, and may also manage budget consumption of a content delivery budget associated with the content campaign. For example, a content campaign may desire to spend an entire content delivery budget by the end of the campaign flight time, and may also desire for relatively smooth budget consumption over time (e.g., relatively equal budget consumption each day of the campaign, with the entire budget consumed by the end of the flight time, etc.). The content delivery server 130 may implement one or more rules or criteria related to presentation of content to users.

As a campaign starts running, embodiments of the disclosure may generate observed user interaction data 140. The observed user interaction data 140 may be generated by the content delivery server 130 or another server in communication with the content delivery server via one or more networks. The observed user interaction data 140 may include one or more data points generated by monitoring actual performance of the content campaign. The observed user interaction data 140 may include metrics 150 indicative of quantifiable user interactions. In FIG. 1, the metrics 150 may include a content delivery pace percentage of 100%, which may indicate a percentage of actually delivered content impressions relative to an expected number of delivered impressions, and an on schedule indicator of 1.0, indicating that the content delivery is at a smooth or linear delivery profile. The observed user interaction data 140 may also include a desired user interaction or user response indicator, which may also be referred to as a function output, which may represented as an absolute value, a percentage, or another metric. In FIG. 1, a response rate for the first content may be 17 responses with a total of 1,020 impressions of the first content, for a response rate of 0.167%. A response rate for the second content may be 145 responses with a total of 875 impressions, for a response rate of 16.571%. The observed user interaction data 140 may also include or may be associated with a previous algorithm output. For example, over a previous time interval, or a previous related content campaign, budget may have been reallocated from the first content to the second content, as indicated by the algorithm output of budget reallocation from the first content to the second content. Other embodiments may include additional or fewer, or different data, as well as calculations, such as conversion rates and the like.

The observed user interaction data 140 may be fed or otherwise communicated to a predictive modeling engine 160. The predictive modeling engine 160 may be stored at the content delivery server 130 or at another server in communication with the content delivery server 130. The predictive modeling engine 160 may be configured to generate one or more predictive functions or models based at least in part on the observed user interaction data 140 and the initial content delivery settings 110. In some embodiments, the predictive modeling engine 160 may include an exponentiated gradient algorithm 170 or related functionality or logic. The exponentiated gradient algorithm 170 may be static over the duration of a content delivery campaign, and, in some instances, may be modified or adjusted upon consumption of observed data. The exponentiated gradient algorithm 170 may be used to determine one or more budget allocation or reallocation recommendations for a particular content campaign. Exponentiated gradient algorithms, as used herein, may use components of a gradient in the exponents of factors that are used in updating a weight vector multiplicatively. Exponentiated gradient algorithms may be used to predict one or more outcomes based at least in part on changes or adjustments to one or more variables in a function. The one or more variables may be content delivery parameters. Using an exponentiated gradient algorithm, embodiments of the disclosure may generate budget allocation values that maximize outcome or user interaction, thereby maximizing effectiveness of content campaigns. While discussed in the context of an exponentiated gradient algorithm, other embodiments may utilize or determine different algorithms, functions, or models to determine budget allocation values, such as automated machine learning.

The predictive modeling engine 160 may include Gaussian process logic 180 that may be implemented to generate a predictive function modeled on a Gaussian process. Gaussian processes may be used for the predictive modeling because of properties inherited from the normal. Distributions of various derived quantities can be obtained explicitly using Gaussian processes, and such quantities may include the average value of the process over a range of times and the error in estimating the average using sample values at a small set of times. The predictive model may be configured to fit the observed user interaction data using the known variable settings.

The predictive model may be used to generate one or more recommended adjustments to variable campaign delivery settings, such as frequency cap and/or base bid values, that may result in increased function output, where the output is the desired user interaction, thereby increasing effectiveness of a content campaign. In some embodiments, an acquisition function may be used to determine which values to recommend as adjustments.

The predictive modeling engine 160 may generate confidence scores for one or more of the recommended adjustments, and may rank the recommended adjustments based at least in part on the confidence score. The confidence scores may be indicative of a likelihood that the particular adjustment will result in a maximized output of the function. In some embodiments, the confidence score may be generated for sets of more than one recommended adjustment. For example, if recommendations for two variables are generated, confidence scores may be generated for each set of two potential adjustments, rather than for individual adjustments. The confidence scores for each set may be ranked, and the set with the highest likelihood of maximizing the output of the predictive model may be selected as a recommendation. The recommended adjustment for each respective variable with the highest confidence score may be recommended as an adjustment. In some embodiments, the variables may be automatically adjusted, for example, by the predictive modeling engine 160. In some embodiments, confidence scores may not be compared against a confidence score threshold, and may instead be weighted based at least in part on the confidence score. For example, an adjustment with a relatively high confidence score may be given a relatively high weight, while an adjustment with a relatively low confidence score may be given a relatively low weight. Model accuracy may also be weighted or determined based at least in part on confidence scores.

The predictive modeling engine 160 may generate one or more recommended adjustments to variables in the initial content delivery settings 120. For example, the predictive modeling engine 160 may recommend adjusted content delivery settings 190 that include adjusting the budget allocation to 55% of the budget to the first content, and 45% to the second content, which is a decrease of 5% to the first content and an increase of 5% to the second content. The reallocation may be based at least in part on the effectiveness of the second content, as determined, in part, by the response rates. The predictive modeling engine 160 may also recommend a frequency cap adjustment for the first content of −2, or 3 times per 24 hours, and a frequency cap adjustment of +2, or 3 times per 24 hours for the second content. The recommended adjustments may be recommended because each had the highest relative confidence score for the respective variable, and may result in maximization of the function output, or in FIG. 1, the desired user conversion.

A step size, or a size of a particular budget reallocation may be based in part on an elapsed flight time of a campaign, or a length of time a campaign has been running. In another example, step size may be based at least in part on a remaining length of a content campaign. For example, towards the beginning of a campaign, step size may be relatively large, whereas near the end of a campaign, step size may be relatively small, so as to decrease a length of time to reach optimal values during a campaign. Step size may also be affected by forecasted signals, such as an anticipated drop in traffic over a weekend, or another forecast signal. In the example of FIG. 1, a step size of 5% may be an early adjustment, while a relatively late adjustment may be a 0.25% adjustment or reallocation.

In some embodiments, the predictive modeling engine 160 may initiate the adjustments to the variables, while in other embodiments, the predictive modeling engine 160 may send adjusted content delivery settings 190 or recommended adjustment data to another server, such as the content delivery server 130. Campaign managers may be notified, for example with an email or text message, when a budget shift has occurred on one of their campaigns. In some embodiments, campaign managers may be able review and/or approve budget shifts or reallocations, while in other embodiments, the budget shifts may be automatically implemented.

The process may be performed iteratively so as to facilitate optimal content campaign delivery settings and enable content creators to satisfy campaign goals. Campaign performance may be tracked or determined based at least in part on one or more conversion pixels. Conversion pixel location may vary, for example, from a purchase page to a landing page, depending on optimization.

By generating recommended adjustments for content delivery variables or other function values, embodiments of the disclosure may maximize function output and increase or improve campaign performance by increasing user interaction or desired user response. As a result, campaign managers and other users may have additional time to focus efforts on other aspects of a campaign, such as creative materials. By generating new predictive models based at least in part on actual observed data, accuracy of predictive models can be determined and improved over time, resulting in faster convergence to optimal settings. As a result, campaign managers may not have to manually adjust content delivery parameters over the flight time of a campaign, because embodiments of the disclosure may automatically adjust variables or recommend adjustments for variables. Certain settings may be continually or periodically updated based at least in part on observed data, rather than converging to optimal settings. For example, budget allocation values may be updated based at least in part on a campaign goal and/or observed data.

The systems, methods, computer-readable media, techniques, and methodologies for automated server-based content delivery may result in improved campaign performance by determining optimal variable values or settings, or settings that may result in improved accomplishment of campaign goals. As a result, manual manipulation of campaign parameters may not be needed.

Example embodiments of the disclosure provide a number of technical features or technical effects. For example, in accordance with example embodiments of the disclosure, certain embodiments of the disclosure may generate recommendations for campaign parameter values that may result in maximized output. Output may be a quantifiable user interaction or user response that is affected by one or more of the variable parameters. Embodiments of the disclosure may automatically adjust campaign parameter settings or values based at least in part on observed data and determine predictive models used to generate the recommended parameter values or settings. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
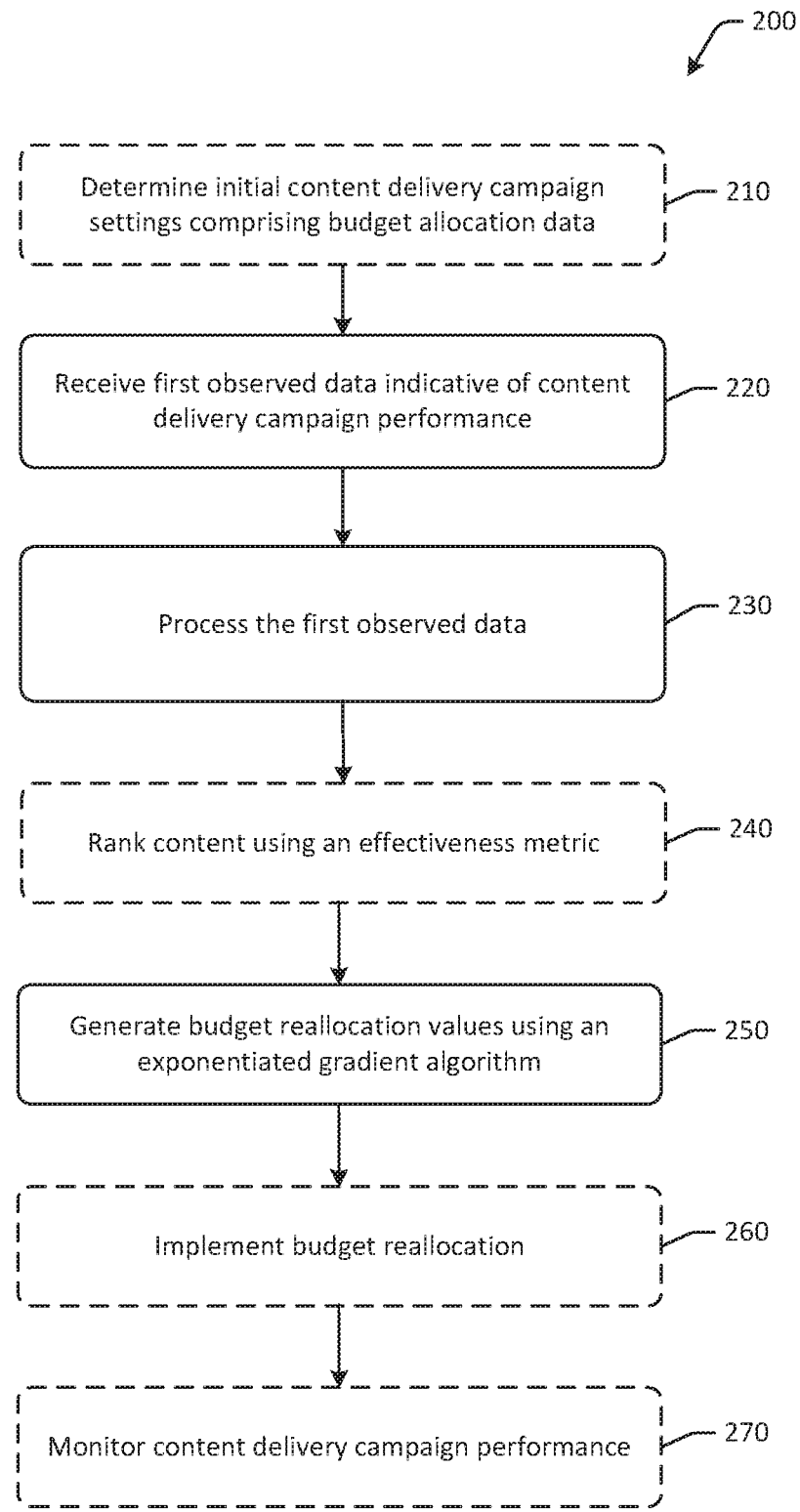
FIG. 2 is an example process flow diagram for automated server-based content delivery in accordance with one or more embodiments of the disclosure.

Referring now to FIGS. 2-5, an example process flow 200 for automated server-based content delivery in accordance with one or more embodiments of the disclosure is depicted in FIG. 2. Although certain operations are illustrated as occurring separately in FIG. 2, some or all of the operations may occur concurrently or partially concurrently across one or more computer systems.

At optional block 210 of the process flow 200, initial content campaign settings comprising budget allocation data are determined. For example, one or more campaign management server(s) may determine or receive initial content campaign delivery settings comprising budget allocation data. Budget allocation data may include an amount, a percentage, or a portion of a total budget to allocate to particular content and/or distribution channels. For example, budget allocation data may indicate that $1,000,000 is to be spent on mobile device content delivery, or that $600,000 of a total budget of $1,200,000, or 50%, is to be spent on particular creative material. Budget allocation data may be a delivery constraint in some instances, in that the budget allocated to particular content or distribution may be an upper limit or a target. Content or campaign managers may desire specific budget consumption, such as a smooth or linear budget consumption over the flight time of a campaign, such that a disproportionately large portion of the budget is not consumed too early or too late over the course of the campaign.

Budget allocation data may be included in campaign information for a content delivery campaign. Budget allocation data may include specific budget allocation values for content. Budget allocation values may be amounts or percentages, or another metric of a total or global budget, that is to be spent on or otherwise allocated to particular aspects of the content campaign. In some embodiments, budget allocation data or values may be included as part of initial content delivery campaign settings for content delivery campaigns.

Content delivery campaign settings or campaign information may include content delivery settings such as one or more frequency cap values for specific content and/or distribution channels, and one or more base bid values for specific content and/or distribution channels. In one embodiment, the budget allocation values, frequency cap values, and/or the base bid values may be received by the campaign management server, while in other embodiments, the respective values may be determined by the campaign management server. For example, the campaign management server may receive initial campaign inputs manually entered by a user. In another example, the campaign management server may determine recommended or initial campaign values for one or more variable settings based at least in part on a goal of the content creator and/or an output to be maximized.

Block 220 of the process flow 200 includes determining or receiving first observed data indicative of content delivery campaign performance. Content delivery campaign performance may be represented, in one example, by user response rates for particular content or distribution channels. User responses may be purchases, clicks, views, ratings, or other responses. Response rates may be determined based at least in part on a number of responses divided by a number of total impressions, in one example. An impression may be an instance of presentation of content, and an impression count may be a total number of times content has been presented. Content delivery campaign performance may be indicated by user response to content presented based at least in part on the content delivery campaign settings. Content may be delivered at a delivery rate and/or delivery schedule based at least in part on the values or settings, such as frequency cap, base bid, budget allocation, and the like. In some embodiments, the campaign management server may manage delivery of the content, while in other embodiments, the campaign management server may communicate values or delivery settings to one or more remote servers, such as a content delivery server, to facilitate delivery of content.

The first observed data may include quantified user response data representing a first number of user response actions attributed to presentation of first content, and a second number of user response actions attributed to presentation of second content. Using the quantified user response data, the campaign management server may determine whether the first number of user response actions and/or the second number of user response actions meet or exceed, or otherwise satisfy, a confidence threshold. The confidence threshold may be a minimum number of user responses that may be observed in order to reliably use the observed data as a representation of the campaign performance. For example, if only 1 user response has been quantified, the confidence threshold may not be met and the data may not be a reliable representation of campaign performance. The confidence threshold may be a function of the delivery settings and/or the number of impressions delivered and may be dynamically adjusted over the course of a campaign.

The observed data may include data corresponding to user interaction data indicative of user interaction responsive to the content. For example, a content delivery server may monitor user interaction or user response of users that are presented with the content. Upon determining a user interaction occurrence, the content delivery server may log the particular user interaction (e.g., a purchase, a click-through, content consumption, span time, etc.), a user identifier, and/or contextual data. The observed data may be used to determine purchase rates or other quantifiable user interactions attributable to the content. For example, if a user is presented with, and consumes, the content, and then initiates a purchase of a product associated with the content within a predetermined time period (e.g., 5 days, 2 weeks, etc.), the purchase may be attributed to the content and logged as observed data. The observed data may further include the actual return on content delivery budget (as determined by purchase rates for purchases attributed to the content or the content campaign, etc.). The observed data may be data collected during a predetermined time interval, such as 12 hours, 1 day, or another time interval.

Block 230 includes processing the first observed data. Processing may include manipulation of the first observed data using an exponentiated gradient algorithm. In one example, the exponentiated gradient algorithm may be generated by the campaign management server or another computer system, and may be specific to the observed data and the content delivery settings, such as budget allocation values, frequency caps, and base bids, that were in effect when the observed data was collected. In another example, the exponentiated gradient algorithm may be predetermined and may receive the observed data. Using the observed data, the exponentiated gradient algorithm may determine one or more budget allocation value adjustments. The exponentiated gradient algorithm may be used to predict or determine campaign performance with candidate adjustments to various delivery settings, such as the budget allocation values. For example, the exponentiated gradient algorithm may predict a total response rate, or a response rate combined across all facets of a campaign (e.g., all creative, all distribution channels, etc.) for the content delivery campaign, as well as predicted response rates for specific content or distribution channels. The exponentiated gradient algorithm may be used to update or adjust budget allocation values based at least in part on observed data. Changes or adjustments to the exponentiated gradient algorithm, in one example, may be based at least in part on a response to input data.

The budget allocation values, frequency cap values, and base bid values may represent adjustable variables or delivery settings in a function for which the output is the output to be maximized. For example, the output of the function may be a content creator goal, such as a number of purchases attributed to the content presented to users or maximizing a return on content delivery budget. Using the exponentiated gradient algorithm for a campaign, delivery settings may be optimized so as to maximize user response rates, or goal of the content creator.

Optional block 240 includes ranking content by an effectiveness metric. Effectiveness metric may be any suitable metric, such as user reach, number of impressions, user response rate, attributed purchase rate, conversion rate, cost of presentation, or another metric. Ranking may be used to create an order of effectiveness for content or distribution channels that result in the most impactful engagement with users. In some embodiments, the predicted response rates may be used to rank the different content and/or distribution channels associated with a content campaign.

Block 250 includes generating one or more budget reallocation values using the exponentiated gradient algorithm. Budget reallocation values or reallocation amounts may be indicative of reallocation of a portion of the total budget from one content to another, or from one distribution to another, so as to maximize user interaction or response rate, or the output of the exponentiated gradient algorithm. Budget reallocation may be in certain predetermined step sizes, such as certain percentages of a total budget. Step size may be indicative of an amount of budget by which to reallocate budget and may be based at least in part on an elapsed time of a campaign, a remaining time of a campaign, a remaining budget of a campaign, a consumed budget of a campaign, or other factors.

Optional block 260 includes implementing the budget reallocation. In some embodiments, the campaign management server may implement the budget reallocation automatically, or may send the budget reallocation data to another server. In other embodiments, the budget reallocation may be sent to a campaign manager for approval or for other notification.

In some embodiments, implementation of the budget reallocation may automatically override a delivery constraint, while in other embodiments, an override request may be sent to a campaign manager for approval. For example, a delivery constraint of 10% maximum budget consumption per day of the campaign may be set by a campaign manager. However, embodiments of the disclosure may determine that the weekend days do not result in relatively high user response rates, and as a result, additional budget should be reallocated from weekend days to weekdays. In some instances the delivery constraint may be overridden automatically, while in other embodiments, a request may be generated and sent to another device for approval of the override. In one example, overrides may be determined in real-time based at least in part on a likelihood of user interaction. For example, if a user is at a checkout page, the likelihood of the user responding to content may be relatively high, and so an override to present content to the user may be implemented, even if the daily budget has been consumed.

Optional block 270 includes monitoring content delivery campaign performance. Upon initiating the budget reallocation, the content delivery campaign performance may be monitored to determine whether the budget reallocation actually resulted in improved or increased user interaction or response rate. Updated performance data may be captured over subsequent time intervals as observed data, and the exponentiated gradient algorithms may be used to process the subsequent observed data.

The process flow 200 may be repeated periodically as subsequent observed data is received. For example, observed data may be received daily, and predictive models or exponentiated gradient algorithms may be generated or used for each individual set of observed data, or for a set of historical observed data for any given content campaign. As the observed data is collected, the outputs of the predictive model or exponentiated gradient algorithm may be maximized and the value recommendations for the content delivery settings may converge toward optimal values for certain settings.

Figure 3:
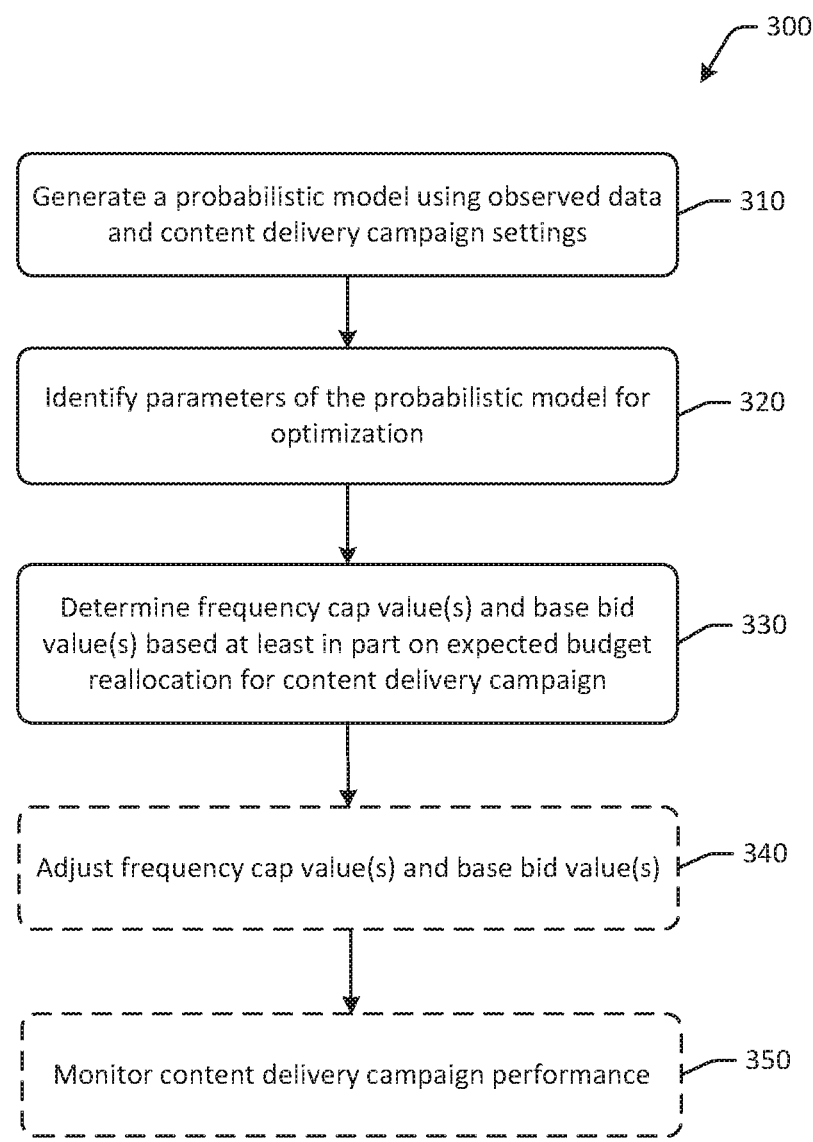
FIG. 3 is an example process flow diagram for generating probabilistic models for content delivery campaigns in accordance with one or more example embodiments of the disclosure.

Referring to FIG. 3, an example process flow 300 for generating probabilistic models for content delivery campaigns in accordance with one or more example embodiments of the disclosure is depicted. At block 310, a predictive model engine may generate a probabilistic model using observed data and content delivery campaign settings. The probabilistic model may outputs a predicted total user response rate. For example, a campaign management server may receive first observed data indicative of user interaction to presented content during a first time interval. The predictive model engine may be executed at a campaign management server or another server on a content delivery network. The observed data may comprise content delivery settings or values that were used during the first time interval, and the resulting content delivery metrics and/or user interaction data. Content delivery metrics may include a number of auctions won, a number of delivered impressions, a number of unique users, or other content delivery metrics. User interaction data may include purchases attributed to the content, clicks, engagements, or other interactions with, or as a result of, presentation of the content to a user.

A probabilistic model may be generated to fit the observed data. In some embodiments, computer-executable instructions of one or more module(s) stored at a campaign management server may be executed to generate the probabilistic model that fits the observed data. The probabilistic model may be a function that maps to the observed data so as to generate a predicted output value based on adjustments to the content delivery settings, such as frequency cap, base bid, and the like. For example, the probabilistic model may generate a predicted return on content delivery budget based at least in part on an adjustment to the base bid and/or the frequency cap values of the function. In some embodiments, the predictive model may be modeled as a Gaussian process and/or a Bayesian formulation. A Gaussian process may be used for the predictive modeling because of properties inherited from the normal. Distributions of various derived quantities can be obtained explicitly using Gaussian processes, and such quantities may include the average value of the process over a range of times and the error in estimating the average using sample values at a small set of times.

Block 320 includes identifying parameters of the probabilistic model for optimization. For example, parameters such as frequency cap values or base bid values for content or distribution channels may be identified for optimization. In some embodiments, parameters may be automatically identified as non-optimal, while in other embodiments, indications of manually identified parameters may be received.

Block 330 includes determining one or more frequency cap values and one or more base bid values for content delivery campaigns based at least in part on an expected budget reallocation for the content delivery campaign. The frequency cap values and/or base bid values may result in maximized probabilistic model or function output. For example, upon generating the probabilistic model, the predictive model engine may generate candidate adjustments to one or more content delivery settings, so as to maximize a predicted output value of the predictive function. In some embodiments, more than one setting in the probabilistic function may be adjusted, while in other embodiments a single setting may be adjusted during a time interval. For example, base bid values may be adjusted in addition to frequency cap values. The adjustments to the delivery settings may result in maximization of the probabilistic model output.

In an example, a delivery constraint of 100% expected daily budget consumption may be implemented, with a frequency cap between 1 and 6 to meet the daily budget consumption goal. During a first day in this example, the frequency cap may be 1, with an outcome of 80% delivery. Embodiments of the disclosure may adjust the frequency cap to 3 for the second day. During the second day, with frequency cap of 3, the outcome may be 90% delivery. Embodiments of the disclosure may adjust the frequency cap to 6, with a resultant outcome of 115% delivery on the third day. Embodiments of the disclosure may then adjust the frequency cap 4, with a resultant outcome of 100% delivery. Embodiments of the disclosure may maintain the frequency cap at 4, or may adjust the frequency cap to another number for the next day (e.g., due to forecasted drop in traffic, etc.).

Optional block 340 includes adjusting frequency cap value(s) and base bid value(s). In some embodiments, the probabilistic model may account for budget reallocation values and the expected impact on outcome (e.g., the process of FIG. 2) in generating additional value adjustments, such as adjustments for frequency cap values or base bid values.

Using the probabilistic model, embodiments of the disclosure may generate recommendations or adjustments for frequency cap or base bids, for specific content or distribution channels or for entire or portions of campaigns, which result in maximum output of the probabilistic model.

In some embodiments, adjustments generated by the probabilistic model may be ranked based at least in part on an associated confidence score representing a likelihood that the adjustment maximizes the outcome. In some embodiments, the predictive model engine may calculate or otherwise compute a confidence score for one or more candidate adjustments to a particular values. The confidence score may be indicative of a likelihood that adjusting the particular parameter to that specific candidate adjustment will result in maximization of the output value of the predictive function. Upon determining confidence scores for the candidate adjustments to a particular parameter, a candidate adjustment with the highest relative confidence score may be selected as a recommended adjustment. Candidate adjustments may be generated by the predictive model engine for one or more adjustable parameters of the predictive function. Each of the candidate adjustments may be assigned a confidence score, and the candidate adjustments with the highest relative confidence scores may be selected as recommended adjustments for the parameter the candidate score is associated with. As a result, a function with only one adjustable parameter may have a single recommended adjustment, while another function may have two or more recommended adjustments. In some embodiments, a candidate adjustment may meet a minimum confidence score or minimum confidence threshold in order to be a recommended adjustment. In some embodiments, an acquisition function may be used to determine better or more optimal values for particular parameters that may result in increased output. Other embodiments may determine weights for candidate adjustments rather than using confidence score minimums or other hard thresholds. As a result, at times when available data is limited, such as near a campaign beginning, predictive models may still explore with little confidence in order to determine any potential learnings.

In some embodiments, confidence scores may also be generated for predictive models. For example, the predictive model engine may determine a difference between an actual output value for certain parameter settings based on observed data and a predicted output value that was generated by the predictive model engine before the observed data was received. The predictive model engine may use the difference to determine a confidence score for the predictive function or model, where the confidence score is indicative of a likelihood of accuracy of the predictive function or model. In some embodiments, the confidence score of a predictive function may meet a minimum confidence threshold prior to being used to determine recommended adjustments.

Optional block 350 includes monitoring content delivery campaign performance. Upon initiating the frequency cap and base bid values, the content delivery campaign performance may be monitored to determine whether the frequency cap and base bid values actually resulted in improved or increased user interaction or response rate. Updated performance data may be captured over subsequent time intervals as observed data, and the subsequent observed data may be processed and/or analyzed.

Figure 4:
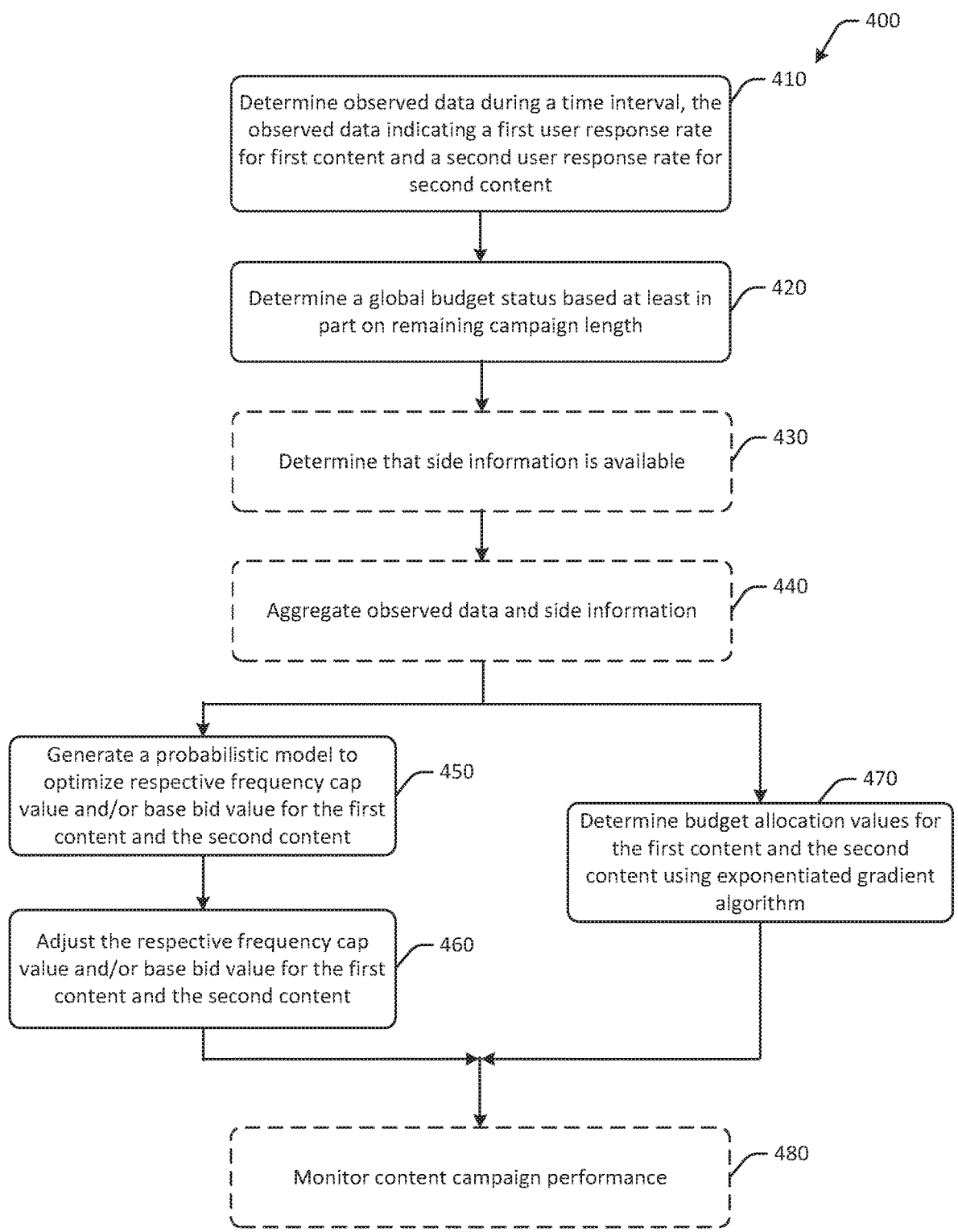
FIG. 4 is an example process flow diagram for automated server-based content delivery in accordance with one or more embodiments of the disclosure.

FIG. 4 depicts an example iterative process flow 400 for automated server-based content delivery in accordance with one or more embodiments of the disclosure. At block 410 of the process flow 400, observed data during a time interval is determined, the observed data indicating a first user response rate for first content and a second user response rate for second content. The observed data may include a return on content delivery budget, an on schedule indicator, or another metric indicative of campaign performance. The first content and the second content may be associated with a content campaign and may be on the same or different distribution channels.

At block 420, a global budget status based at least in part on a remaining campaign length is determined. The global budget status may be determined based at least in part on a delivery schedule, pacing, a consumed and/or remaining budget, and other metrics.

At optional block 430, a determination is made that side information is available. Side information may be used by probabilistic models or fed into exponentiated gradient algorithms to determine content delivery parameters or adjustments, Side information may include forecast signals, filter metrics, and the like. For example, computer-executable instructions of one or more campaign management module(s) stored at a campaign management server may be executed to determine whether side information, such as a forecast signal, is available. A forecast signal may be an indication of an upcoming or expected change in delivery for the first content or the second content. For example, a forecast signal may indicate a drop or increase in traffic due to a weekend or holiday, seasonality and related changes in user composition or traffic, site traffic changes, likely competitor information, product inventory levels, bidding strategies, best seller rankings, and other signals. Filter metrics may include frequency accounting for a number of times certain content was filtered out or not presented for factors or constraints, including budget allocation constraints, frequency cap constraints, and the like.

If side information is available, at optional block 440, the observed data and side information may be aggregated for input into one or more models or algorithms.

The process flow 400 may proceed to either, or both, block 450 and/or block 470. At block 450, a probabilistic model to optimize respective frequency cap values and/or base bid values for the first content and/or the second content may be generated. The probabilistic model may be determined based at least in part on the observed data and, if available, the side information. The process flow 400 may then proceed to block 460, at which the respective frequency cap value and/or the base bid value for the first content and the second content are adjusted.

At block 470, respective budget allocation values for the first content and the second content may be determined using an exponentiated gradient algorithm. The determined budget allocation values may be optimal budget allocations. The budget allocation values may be determined based at least in part on the observed data and, if available, the side information. The exponentiated gradient algorithm may be used to process or otherwise analyze the observed data and/or campaign settings. The process flow 400 may proceed to optional block 480.

At optional block 480, content campaign performance may be monitored to determine an actual response to the delivery parameter adjustments.

In some embodiments, a determination may be made as to whether the content delivery campaign settings are optimized. For example, computer-executable instructions of one or more campaign management module(s) stored at a campaign management server may be executed to determine if user response has been maximized via optimization of delivery settings. In one embodiment, this determination may be made by analyzing output performance of the campaign using the current delivery settings. If it is determined that the content delivery campaign settings are not optimized, the process flow 400 may return to block 410 in an iterative process to be completed after additional observed data is available, or after a period of time has elapsed.

In subsequent iterations of the process flow 400, the same algorithms or additional predictive models or functions may be generated to determine adjustment recommendations. Predictive models may be generated for specific segments of observed data, or for some or all historical data associated with a content campaign. The process flow 400 may be performed until optimal values are determined for the adjustable parameters. In some embodiments, actual content may be delivered using different distribution channels, such as television or mobile device distribution channels, which may result in reduced computer processing power and bandwidth consumption.

Figure 5:
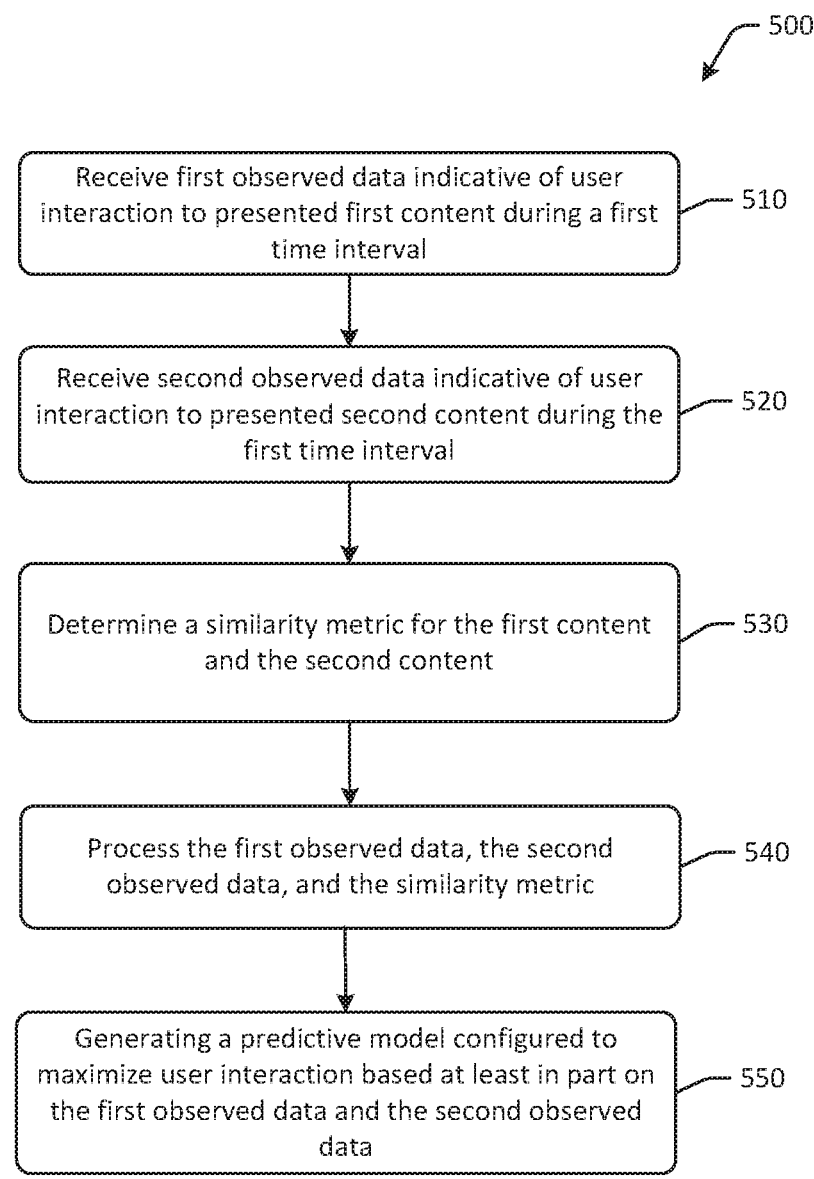
FIG. 5 is an example process flow diagram for determining content similarity and generating predictive models in accordance with one or more embodiments of the disclosure.

FIG. 5 is an example process flow 500 for determining content similarity and generating predictive models in accordance with one or more embodiments of the disclosure. In some embodiments, predictive models and/or exponentiated gradient algorithms may be identified or generated for particular content using observed data for the particular content, or predictive models may be generated for particular campaigns using observed data for all content associated with the particular campaign. In other embodiments, predictive models may be generated based at least in part on observed data for a number of campaigns that are determined to be similar to the campaign or content for which the predictive model is being generated. Recommendations generated by a predictive model based at least in part on aggregated observed data may be applied to one or more campaigns of the similar campaigns. For example, the parameters of one of the set of similar campaigns may be adjusted based at least in part on the recommendations, or the parameters of more than one, or all, of the set of similar campaigns may be adjusted based at least in part on the recommendations. Content similarity may be determined based at least in part on similarity metrics rather than thresholds, and observed data may be weighted differently based at least in part on a level of similarity between content.

Embodiments of the disclosure may generate clusters or sets of similar ads, and use aggregated observed data to build predictive models. The predictive models may be used to generate parameter adjustment recommendations that maximize output for each of the campaigns in the cluster or set of similar ads. In some instances, observed data across all existing campaigns, regardless of similarity, may be aggregated and considered in generating predictive models. Some embodiments may employ a Kronecker products structure in determining similar content, which may include a portion of pre-clustered content defined as similar, and may allow the system to determine additional content similarities based at least in part on observed data.

At block 510 of the process flow 500, first observed data is received, where the first observed data is indicative of user interaction to presented first content during a first time interval. The first observed data may be received by a campaign management server.

At block 520, second observed data is received, where the second observed data is indicate of user interaction to presented second content during the first time interval. The second observed data may be received by the campaign management server. The second content may be associated with the same campaign as the first content, or with a different campaign.

At block 530, a similarity metric for the first content and the second content is determined. In some embodiments, a determination may be made that the second content meets a similarity threshold with respect to the first content. In another example, a similarity metric between the first content and the second content may be compared. Similarity may be determined, for example, by one or more content similarity determination module(s) stored at a campaign management server. Similarity may be determined based at least in part on any number of factors, such as a similarity between products or services associated with the respective content, advertisers associated with the respective content, targeting criteria associated with the respective content, product identifiers associated with the respective content, or other factors. For example, a content similarity threshold may be satisfied when each respective piece of content or the associated campaign is associated with at least one of the same product identifier, the same targeting criteria, the same distribution channel, site similarity, or another delivery metric.

In one example, content similarity may be based at least in part on browse node similarity between a first browse node associated with the first content and a second browse node associated with the second content. A browse node may be represented as a set of webpages associated with a brand, product/service, or type of product/service, etc. To determine browse node similarity, a first set of product identifiers associated with the first content may be determined. A first average browse node hierarchy for the first set of product identifiers may be determined. An average browse node hierarchy may be an alphanumeric structure of the browse node or the associations and/or classifications of the product identifiers associated with the first content.

A second set of product identifiers associated with the second content may be determined. A second average browse node hierarchy for the second set of product identifiers may be determined. A distance between the first average browse node hierarchy and the second average browse node hierarchy may be determined. The distance may be represented as a numeric or alphanumeric difference and may be indicative of an overlap or similarity between the first average browse node and the second average browse node. A determination may be made as to whether the distance meets a similarity threshold. The similarity threshold may be a numeric value or another metric to which the difference can be compared.

At block 540, the first observed data, the second observed data, and the similarity metric may be processed. The observed data and the similarity metric may be used for, or input, to a probabilistic model. A set of content may be generated comprising the first content and the second content, upon determining that the first content and the second content meet the content similarity threshold.

At block 550, a predictive model is generated, where the predictive model is configured to maximize user interaction, or function output, based at least in part on the first observed data and the second observed data. Accordingly, the predictive model may be more accurate than a predictive model generated by a single set of observed data due to the increase data available when the predictive model is generated. By aggregating observed data across a number of similar campaigns, predictive model accuracy may be improved as a result of increased observed data, which may lead to faster convergence of optimal values for adjustable parameters of a function, and improved effectiveness for some or all of the similar campaigns.

One or more operations of the method, process flows, or use cases of FIGS. 1-5 may have been described above as being performed by a user device, or more specifically, by one or more program module(s), applications, or the like executing on a device. It should be appreciated, however, that any of the operations of methods, process flows, or use cases of FIGS. 1-5 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 6:
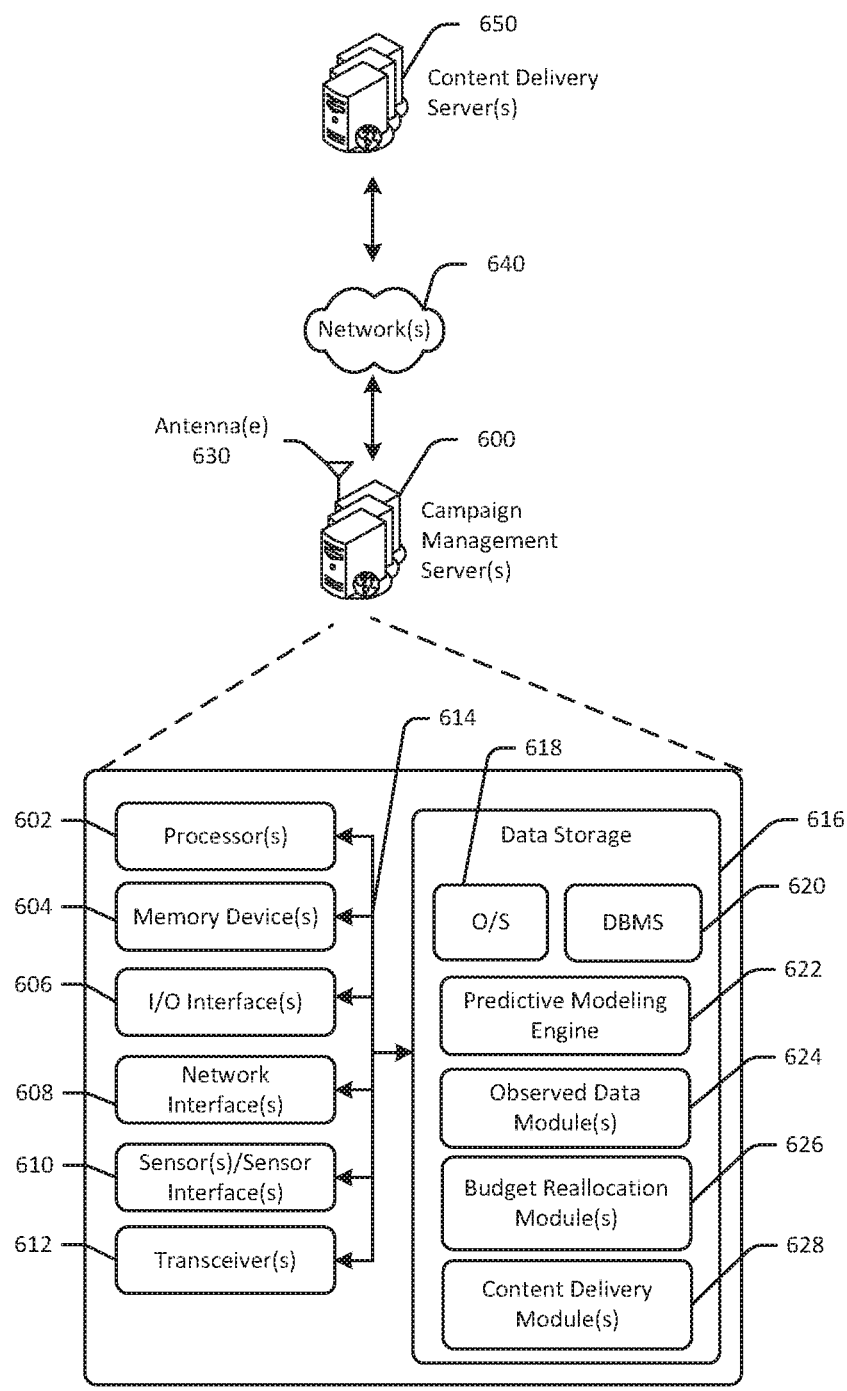
FIG. 6 schematically illustrates an example architecture of a system in accordance with one or more embodiments of the disclosure.

FIG. 6 is a schematic block diagram of one or more illustrative campaign management server(s) 600 in accordance with one or more example embodiments of the disclosure. The campaign management server(s) 600 may include any suitable computing device capable of receiving and/or generating audio including, but not limited to, a server system, a mobile device such as a smartphone, tablet, e-reader, wearable device, or the like; a desktop computer; a laptop computer; a content streaming device; a set-top box; or the like. The campaign management server(s) 600 may correspond to an illustrative device configuration for the campaign management servers of FIGS. 1-5.

The campaign management server(s) 600 may be configured to communicate via one or more networks 640 with one or more servers, user devices, or the like. For example, in the illustration of FIG. 6, the campaign management server(s) 600 may be configured to communicate with a content delivery system(s) 650. The campaign management server(s) 600 may be configured to actively or passively manage one or more aspects of a content campaign, such as content delivery parameters. The content delivery system(s) 650 may be configured to deliver one or more pieces of content and may further be configured to engage in a bidding process for auctions to present content. In some embodiments, a single remote server or single group of remote servers may be configured to perform more than one type of content delivery functionality.

The campaign management server(s) 600 may be configured to communicate via one or more networks 640. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the campaign management server(s) 600 may include one or more processors (processor(s)) 602, one or more memory devices 604 (generically referred to herein as memory 604), one or more input/output ("I/O") interface(s) 606, one or more network interface(s) 608, one or more sensors or sensor interface(s) 610, one or more transceivers 612, and data storage 616. The campaign management server(s) 600 may further include one or more buses 614 that functionally couple various components of the campaign management server(s) 600. The campaign management server(s) 600 may further include one or more antenna(e) 630 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 614 may include at least one of a system bus, a memory bus, an address bus, or a message bus, and may permit exchange of information (e.g., data (including computer-executable code), signaling, etc.) between various components of the campaign management server(s) 600. The bus(es) 614 may include, without limitation, a memory bus or a memory controller, a peripheral bus, an accelerated graphics port, and so forth. The bus(es) 614 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the campaign management server(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 616 may include removable storage and/or non-removable storage including, but not limited to, magnetic storage, optical disk storage, and/or tape storage. The data storage 616 may provide non-volatile storage of computer-executable instructions and other data. The memory 604 and the data storage 616, removable and/or non-removable, are examples of computer-readable storage media (CRSM) as that term is used herein.

The data storage 616 may store computer-executable code, instructions, or the like that may be loadable into the memory 604 and executable by the processor(s) 602 to cause the processor(s) 602 to perform or initiate various operations. The data storage 616 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 616 for non-volatile storage.

More specifically, the data storage 616 may store one or more operating systems (O/S) 618; one or more database management systems (DBMS) 620; and one or more program module(s), applications, engines, computer-executable code, scripts, or the like such as, for example, one or more predictive modeling engine(s) 622, one or more observed data module(s) 624, one or more budget reallocation module(s) 626, and/or one or more content delivery module(s) 628. Some or all of these module(s) may be sub-module(s). Any of the components depicted as being stored in data storage 616 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 616 may support functionality described in reference to correspondingly named components earlier in this disclosure.

The data storage 616 may further store various types of data utilized by components of the campaign management server(s) 600. Any data stored in the data storage 616 may be loaded into the memory 604 for use by the processor(s) 602 in executing computer-executable code. In addition, any data depicted as being stored in the data storage 616 may potentially be stored in one or more datastore(s) and may be accessed via the DBMS 620 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, observed data, historical campaign performance, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the campaign management server(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the predictive modeling engine(s) 622 may include computer-executable instructions, code, or the like that responsive to execution by one or more of the processor(s) 602 may perform functions including, but not limited to, analyzing observed data, determining current parameter values, generating predictive models, generating adjustment recommendations for one or more campaign parameters, and the like. The predictive modeling engine(s) 622 may include Gaussian process logic, for example for generating predictive models that are modeled after Gaussian processes, identifying or determining exponentiated gradient logic or algorithms that may be used to determine whether a budget reallocation is to be recommended or made, including specific budget reallocation amounts or percentages.

The observed data module(s) 624 may include computer-executable instructions, code, or the like that responsive to execution by one or more of the processor(s) 602 may perform functions including, but not limited to, communicating with one or more devices, for example, via wired or wireless communication, receiving or collecting observed data, monitoring user interaction, tracking content delivery, pixel conversion tracking, and the like.

The budget reallocation module(s) 626 may include computer-executable instructions, code, or the like that responsive to execution by one or more of the processor(s) 602 may perform functions including, but not limited to, determining a similarity between one or more pieces of content or campaigns, aggregating observed data, setting or modifying a similarity threshold, calculating a step size or budget reallocation amount, implementing or initiating budget reallocations, and the like.

The content delivery module(s) 628 may include computer-executable instructions, code, or the like that responsive to execution by one or more of the processor(s) 602 may perform functions including, but not limited to, sending recommended parameter adjustments, facilitating adjustments to parameters, actively adjusting parameters, tracking content delivery and performance, adjusting parameters such as frequency caps and base bid values, and the like.

Referring now to other illustrative components depicted as being stored in the data storage 616, the O/S 618 may be loaded from the data storage 616 into the memory 604 and may provide an interface between other application software executing on the campaign management server(s) 600 and hardware resources of the campaign management server(s) 600. More specifically, the O/S 618 may include a set of computer-executable instructions for managing hardware resources of the campaign management server(s) 600 and for providing common services to other application programs (e.g., managing memory allocation among various application programs). In certain example embodiments, the O/S 618 may control execution of the other program module(s) to dynamically enhance characters for content rendering. The O/S 618 may include any operating system now known or which may be developed in the future including, but not limited to, any server operating system, any mainframe operating system, or any other proprietary or non-proprietary operating system.

The DBMS 620 may be loaded into the memory 604 and may support functionality for accessing, retrieving, storing, and/or manipulating data stored in the memory 604 and/or data stored in the data storage 616. The DBMS 620 may use any of a variety of database models (e.g., relational model, object model, etc.) and may support any of a variety of query languages. The DBMS 620 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the campaign management server(s) 600 is a mobile device, the DBMS 620 may be any suitable light-weight DBMS optimized for performance on a mobile device.

Referring now to other illustrative components depicted as being stored in the data storage 616, the O/S 618 may be loaded from the data storage 616 into the memory 604 and may provide an interface between other application software executing on the campaign management server(s) 600 and hardware resources of the campaign management server(s) 600. More specifically, the O/S 618 may include a set of computer-executable instructions for managing hardware resources of the campaign management server(s) 600 and for providing common services to other application programs (e.g., managing memory allocation among various application programs). In certain example embodiments, the O/S 618 may control execution of one or more of the program module(s) depicted as being stored in the data storage 616. The O/S 618 may include any operating system now known or which may be developed in the future including, but not limited to, any server operating system, any mainframe operating system, or any other proprietary or non-proprietary operating system.

The DBMS 620 may be loaded into the memory 604 and may support functionality for accessing, retrieving, storing, and/or manipulating data stored in the memory 604 and/or data stored in the data storage 616. The DBMS 620 may use any of a variety of database models (e.g., relational model, object model, etc.) and may support any of a variety of query languages. The DBMS 620 may access data represented in one or more data schemas and stored in any suitable data repository. In certain example embodiments, the DBMS 620 may be any suitable light-weight DBMS optimized for performance on a mobile device.

Referring now to other illustrative components of the campaign management server(s) 600, the input/output (I/O) interface(s) 606 may facilitate the receipt of input information by the campaign management server(s) 600 from one or more I/O devices as well as the output of information from the campaign management server(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the campaign management server(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 630 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The campaign management server(s) 600 may further include one or more network interface(s) 608 via which the campaign management server(s) 600 may communicate with any of a variety of other systems, platforms, networks, devices, and so forth. The network interface(s) 608 may enable communication, for example, with the wireless router 108, the host server 112, and/or one or more web servers (e.g., the web server 406) via one or more of the network(s) 110.

The antenna(e) 630 may include any suitable type of antenna depending, for example, on the communications protocols used to transmit or receive signals via the antenna (e) 630. Non-limiting examples of suitable antennas may include directional antennas, non-directional antennas, dipole antennas, folded dipole antennas, patch antennas, multiple-input multiple-output (MIMO) antennas, or the like. The antenna(e) 630 may be communicatively coupled to one or more transceivers 612 or radio components to which or from which signals may be transmitted or received.

As previously described, the antenna(e) 630 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 630 may additionally, or alternatively, include a Wi-Fi antenna configured to transmit or receive signals in accordance with established standards and protocols, such as the IEEE 602.11 family of standards, including via 2.4 GHz channels (e.g. 602.11b, 602.11g, 602.11n), 5 GHz channels (e.g. 602.11n, 602.11ac), or 60 GHZ channels (e.g. 602.11ad). In alternative example embodiments, the antenna(e) 630 may be configured to transmit or receive radio frequency signals within any suitable frequency range forming part of the unlicensed portion of the radio spectrum.

The antenna(e) 630 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 630—transmitting or receiving radio frequency (RF) signals in the bandwidth and/or channels corresponding to the communications protocols utilized by the campaign management server(s) 600 to communicate with other devices. The transceiver(s) 612 may include hardware, software, and/or firmware for modulating, transmitting, or receiving— potentially in cooperation with any of antenna(e) 630— communications signals according to any of the communications protocols discussed above including, but not limited to, one or more Wi-Fi and/or Wi-Fi direct protocols, as standardized by the IEEE 602.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the campaign management server(s) 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 6 as being stored in the data storage 616 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the campaign management server(s) 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the campaign management server(s) 600 may include alternate and/or additional hardware, software, or firmware components beyond those described or depicted without departing from the scope of the disclosure. More particularly, it should be appreciated that software, firmware, or hardware components depicted as forming part of the campaign management server(s) 600 are merely illustrative and that some components may not be present or additional components may be provided in various embodiments. While various illustrative program module(s) have been depicted and described as software module(s) stored in data storage 616, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-5 may be performed by a device having the illustrative configuration depicted in FIG. 6, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining, by a server comprising one or more computer processors coupled to at least one memory, campaign information for a content delivery campaign, the campaign information comprising a first budget allocation value for first content, a second budget allocation value for second content, a first frequency cap for the first content, a first base bid for the first content, a second frequency cap for the second content, and a second base bid for the second content;
   determining first observed data comprising a first user response rate for the first content and a second user response rate for the second content, wherein the first user response rate is associated with a first user having a first characteristic, and the second user response rate is associated with a second user having a second characteristic, wherein the first observed data is generated by the server responsive to monitoring actions performed at remote mobile devices;
   determining an exponentiated gradient algorithm for the content delivery campaign;
   determining a predicted total user response rate for the content delivery campaign;
   automatically determining a first reallocation amount to reallocate a portion of a total budget allocation value from the first budget allocation value to the second budget allocation value using the exponentiated gradient algorithm based at least in part on the first observed data, the first budget allocation value, the second budget allocation value, the first frequency cap, the first base bid, the second frequency cap, the second base bid, and the predicted total user response rate, wherein the total budget allocation value comprises a sum of the first budget allocation value and the second budget allocation value, and wherein the first reallocation amount substantially maximizes an output of the exponentiated gradient algorithm;
   determining that third content meets a content similarity metric with respect to the first content and the second content;
   receiving second observed data comprising a third user response rate for the first content, a fourth user response rate for the second content, and a fifth user response rate for the third content after reallocation of the first reallocation amount from the first budget allocation value to the second budget allocation value, wherein the second observed data is generated by the server responsive to monitoring actions performed at the remote mobile devices;
   determining a second reallocation amount using the exponentiated gradient algorithm based at least in part on the first observed data and the second observed data, wherein the second reallocation amount is less than the first reallocation amount;

transmitting the second reallocation amount for approval; and updating the campaign information periodically based at least in part on the second observed data and determining that the second reallocation amount is less than the first reallocation amount.

2. The method of claim 1, further comprising determining that the first user response rate to presentation of the first content is less than the second user response rate to presentation of the second content.

3. The method of claim 2, further comprising ranking the first user response rate and the second user response rate.

4. The method of claim 1, further comprising determining an elapsed flight time of the content delivery campaign, wherein a step size of the first reallocation amount is based at least in part on the elapsed flight time.

5. The method of claim 1, further comprising:
determining side information indicative of an expected change in content delivery traffic;
wherein the exponentiated gradient algorithm for the content delivery campaign uses the side information to determine the first reallocation amount.

6. The method of claim 1, further comprising:
determining a probabilistic model using the first observed data, wherein the probabilistic model outputs the predicted total user response rate;
determining a third frequency cap and a third base bid for the first content using the probabilistic model; and
determining a fourth frequency cap and a fourth base bid for the second content using the probabilistic model;
wherein the third frequency cap, the third base bid, the fourth frequency cap, and the fourth base bid maximize the predicted total user response rate.

7. The method of claim 6, wherein determining the probabilistic model using the first observed data comprises determining the probabilistic model using the first observed data and the first reallocation amount, and wherein the probabilistic model is modeled as a Gaussian process.

8. The method of claim 1, wherein determining that the third content meets the content similarity metric with respect to the first content and the second content comprises at least one of determining a product identifier associated with the third content or determining a distribution channel of the third content.

9. The method of claim 1, wherein the campaign information further comprises at least one delivery constraint, the method further comprising:
generating an override recommendation for the at least one delivery constraint using the exponentiated gradient algorithm.

10. The method of claim 1, further comprising determining that the first user response rate and the second user response rate satisfies a confidence metric indicative of a likelihood that the first reallocation amount will result in maximized output of the exponentiated gradient algorithm.

11. A device comprising:
at least one memory that stores computer-executable instructions; and
at least one processor configured to access the at least one memory and execute the computer-executable instructions to:
determine campaign information for a content delivery campaign, the campaign information comprising a first budget allocation value for first content, a second budget allocation value for second content, a first frequency cap for the first content, a first base bid for the first content, a second frequency cap for the second content, and a second base bid for the second content;
determine first observed data comprising a first user response rate for the first content and a second user response rate for the second content, wherein the first user response rate is associated with a first user having a first characteristic, and the second user response rate is associated with a second user having a second characteristic, wherein the second observed data is generated by the device responsive to monitoring actions performed at remote mobile devices;
determine an exponentiated gradient algorithm for the content delivery campaign;
determine a predicted total user response rate for the content delivery campaign;
automatically determine a first reallocation amount to reallocate a portion of a total budget allocation value from the first budget allocation value to the second budget allocation value using the exponentiated gradient algorithm based at least in part on the first observed data, the first budget allocation value, the second budget allocation value, the first frequency cap, the first base bid, the second frequency cap, the second base bid, and the predicted total user response rate, wherein the total budget allocation value comprises a sum of the first budget allocation value and the second budget allocation value, wherein the first reallocation amount substantially maximizes an output of the exponentiated gradient algorithm;
determine that third content meets a content similarity metric with respect to the first content and the second content;
receive second observed data comprising a third user response rate for the first content, a fourth user response rate for the second content, and a fifth user response rate for the third content after reallocation of the first reallocation amount from the first budget allocation value to the second budget allocation value, wherein the second observed data is generated by the device responsive to monitoring actions performed at the remote mobile devices;
determine a second reallocation amount using the exponentiated gradient algorithm based at least in part on the first observed data and the second observed data, wherein the second reallocation amount is less than the first reallocation amount;
transmit the second reallocation amount for approval; and
update the campaign information periodically based at least in part on the second observed data and determining that the second reallocation amount is less than the first reallocation amount.

12. The device of claim 11, wherein the at least one processor is further configured to access the at least one memory and execute the computer-executable instructions to:
rank the first user response rate and the second user response rate; and
determine that the first user response rate to presentation of the first content is less than the second user response rate to presentation of the second content.

13. The device of claim 11, wherein the at least one processor is further configured to access the at least one memory and execute the computer-executable instructions to:

determine a probabilistic model using the first observed data, wherein the probabilistic model outputs the predicted total user response rate;
determine a third frequency cap and a third base bid for the first content using the probabilistic model; and
determine a fourth frequency cap and a fourth base bid for the second content using the probabilistic model;
wherein the third frequency cap, the third base bid, the fourth frequency cap, and the fourth base bid maximize the predicted total user response rate.

14. At least one non-transitory computer-readable medium comprising computer-executable instructions that, when executed by one or more processors, executes operations comprising:
determining campaign information for a content delivery campaign, the campaign information comprising a first budget allocation value for first content, a second budget allocation value for second content, a first frequency cap for the first content, a first base bid for the first content, a second frequency cap for the second content, and a second base bid for the second content;
determining first observed data comprising a first user response rate for the first content and a second user response rate for the second content, wherein the first user response rate is associated with a first user having a first characteristic, and the second user response rate is associated with second user having a second characteristic, wherein the first observed data is generated by the server responsive to monitoring actions performed at remote mobile devices;
determining an exponentiated gradient algorithm for the content delivery campaign;
determining a predicted total user response rate for the content delivery campaign;
automatically determining a first reallocation amount to reallocate a portion of a total budget allocation value from the first budget allocation value to the second budget allocation value using the exponentiated gradient algorithm based at least in part on the first observed data, the first budget allocation value, the second budget allocation value, the first frequency cap value, the first base bid value, the second frequency cap value, the second base bid value, and the predicted total user response rate, wherein the total budget allocation value comprises a sum of the first budget allocation value and the second budget allocation value, and wherein the first reallocation amount substantially maximizes an output of the exponentiated gradient algorithm;
determining that third content meets a content similarity metric with respect to the first content and the second content;
receiving second observed data comprising a third user response rate for the first content, a fourth user response rate for the second content, and a fifth user response rate for the third content after reallocation of the first reallocation amount from the first budget allocation value to the second budget allocation value, wherein the second observed data is generated by the server responsive to monitoring actions performed at the remote mobile devices;
determining a second reallocation amount using the exponentiated gradient algorithm based at least in part on the first observed data and the second observed data, wherein the second reallocation amount is less than the first reallocation amount;
transmitting the second reallocation amount for approval; and
updating the campaign information periodically based at least in part on the second observed data and determining that the second reallocation amount is less than the first reallocation amount.

15. The at least one non-transitory computer-readable medium of claim 14, wherein the operations further comprise:
generating a probabilistic model using the first observed data, a third budget allocation value, and a fourth budget allocation value, wherein the probabilistic model is modeled as a Gaussian process, and wherein an output of the probabilistic model is the predicted total user response rate;
determining a first adjustment for the first frequency cap value, a second adjustment for the second frequency cap value, a third adjustment for the first base bid value, and a fourth adjustment for the second base bid value, wherein the first adjustment, the second adjustment, the third adjustment, and the fourth adjustment result in maximum output of the probabilistic model; and
adjusting the first frequency cap value using the first adjustment, the second frequency cap value using the second adjustment, the first base bid value using the third adjustment, and the second base bid value using the fourth adjustment.

16. The at least one non-transitory computer-readable medium of claim 14, wherein the operations further comprise:
determining an elapsed flight time of the content delivery campaign, wherein a step size of the first reallocation amount is based at least in part on the elapsed flight time.

17. The at least one non-transitory computer-readable medium of claim 14, wherein the operations further comprise:
determining side information indicative of an expected change in content delivery traffic;
wherein the exponentiated gradient algorithm for the content delivery campaign uses the side information to determine the first reallocation amount.

18. The method of claim 1, wherein the first observed data and the second observed data are generated using an algorithm executed at the server, and are input at the exponentiated gradient algorithm at the server.

\* \* \* \* \*